Dec. 11, 1956 J. L. FINCH ET AL 2,774,041
CONTROLLED SINGLE-SIDEBAND TRANSMITTER
Filed Aug. 31, 1953
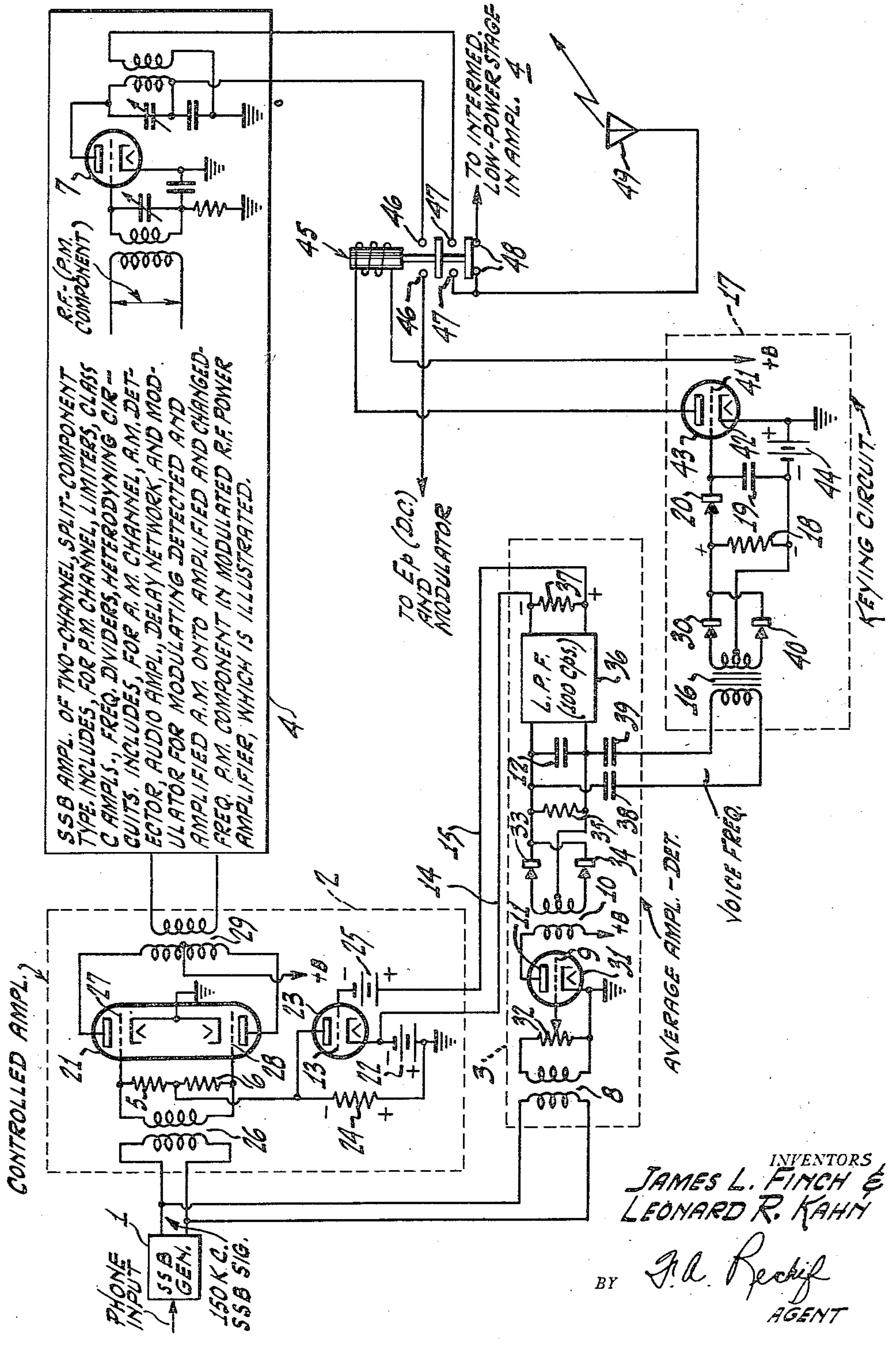
INVENTORS
JAMES L. FINCH &
LEONARD R. KAHN
BY F.A. Reckif
AGENT United States Patent Office 2,774,041

Patented Dec. 11, 1956

2,774,041

CONTROLLED SINGLE-SIDEBAND TRANSMITTER

James L. Finch, East Rockaway, and Leonard R. Kahn, New York, N. Y., assignors to Radio Corporation of America, a corporation of Delaware Application August 31, 1953, Serial No. 377,364

17 Claims. (Cl. 332—37)

This invention relates to a single sideband (SSB) transmitter, and more particularly to a transmitter of this type including a gain-controlled amplifier.

This invention constitutes an improvement over the SSB transmitter system disclosed and claimed in the copending L. R. Kahn application, Serial No. 242,061, filed August 16, 1951, now Patent No. 2,666,133, dated January 12, 1954, and also disclosed in the paper by L. R. Kahn entitled "Single Sideband Transmission by Envelope Elimination and Restoration," IRE Proceedings, July 1952, pp. 803–806.

The aforementioned Kahn disclosures disclose a novel method for amplifying SSB suppressed carrier signals which are generated at low power in any conventional manner. In such method the two distinct components of SSB signals, the amplitude modulation (AM) and phase modulation (PM) components, are separately handled in separate channels. The SSB signals are passed through a limiter which cuts out the AM component but passes the PM component. The PM component is then amplified up to the desired level in one amplifier chain, the limiter and this amplifier chain thus constituting the PM channel. In the AM channel, the AM component is detected in an AM detector and the detected audio component is amplified in a separate amplifier chain. Finally, through a modulator, operating in conjunction with a radio frequency power amplifier (RFPA) output stage, the detected and amplified AM component modulates the amplified PM component, resulting in a high power, pure, SSB wave.

The system described relies, for proper operation, upon a cancellation of the undesired sidebands in the PM spectrum by means of similar but opposite sideband components produced by the AM in the RFPA. The system will operate in an optimum manner when the average amplitude of the signal energy to be transmitted is constant over a certain interval of time, say 0.1 second or more. However, if the average amplitude of the AM component varies the undesired sidebands will not remain balanced at the output of the RFPA and the system will not operate in optimum fashion. For example, voice waves are not of constant average amplitude (there are variations at syllabic frequency in the amplitude of such waves) and therefore for this form of transmission the system so far described will not operate in optimum fashion. The terms "syllabic frequency" and "syllabic frequencies," as used in the present specification and claims, refer to the actual periodicity or frequency of occurrence of separate, individual syllables in normal human speech. This frequency of occurrence of syllables is much lower than any "voice frequencies," which latter term ordinarily refers to the frequency of the human voice considered as a tone or sound. For example, a frequency of 100 C. P. S. (the cutoff frequency of low pass filter 36) is considerably higher than any syllabic frequencies normally occurring in human speech, while this same frequency of 100 C. P. S. is far below any voice frequencies of consequence, even for male voices.

Thus, "voice frequencies" and "syllabic frequencies" lie in entirely different ranges.

An example may help to make the foregoing clearer. For purposes of analysis, let us assume that the modulation in the SSB signal consists of a simple 1000 C. P. S. tone, the level of which is varied between 10 volts and zero. Assume also that the carrier (for an SSB, suppressed-carrier type of SSB generator) is set at a level 20 db below the 10 volts, i. e., at a 1-volt level. An analysis will show that with the 1000 cycles per second (C. P. S.) tone at the 10 volt level the output of the SSB generator will consist of one RF representing the carrier, with an amplitude of one volt, and a second RF spaced 1000 C. P. S. above the carrier, with an amplitude of 10 volts, representing the sideband (assuming that the SSB generator delivers the upper sideband). The AM component of this signal will be equivalent to an RF signal of a frequency 1000 C. P. S. greater than the carrier, modulated with an approximate sine wave between limits of 9 volts and 11 volts. The PM component will be a frequency 1000 C. P. S. above the carrier, phase modulated between limits of about 5.5°±. The aforementioned Kahn system will amplify this SSB signal to, say, an average amplitude of 1000 volts with a superimposed approximate sine wave amplitude modulation between the limits of 900 volts and 1100 volts. The PM at the output of the final PM amplifier will have the same deviation as originally.

Now assume that the 1000 C. P. S. tone is reduced in amplitude by 40 db, i. e., to 0.1 volt. With voice, for example, the reduction in amplitude could be the result of a syllabic variation in speech. An analysis will show that the output of the SSB generator will now consist of one RF representing the carrier, with an amplitude of 1 volt, and a second RF spaced 1000 C. P. S. above the carrier, with an amplitude of 0.1 volt, representing the sideband. The average amplitude of the PM component of this new SSB signal is held constant by the action of the limiter which separates out the PM component, so that the limiter output contains only the PM component. This PM component now consists of a carrier frequency component phase modulated by the 1000 C. P. S. component representing the modulation, which is spaced 1000 C. P. S. above the carrier. It just happens that in this case the carrier is phase modulated between the limits of 5.5°±, the same as in the first case. Thus, in these two special cases the side bands in the PM channel output to PM will be of the same strength in the second case as in the first (except now the carrier is the predominating component, modulated by the signal, with the resulting side frequencies lying each side of the carrier). However, the AM component of this new SSB signal will be equivalent to an RF signal of the carrier frequency of 1 volt level, modulated with an approximate sine wave between limits of 0.9 and 1.1 volts, representing a modulation of 10%. Thus, the AM component in the second case will be reduced to 0.2 volt peak-to-peak, instead of 2.0 volts. This AM would appear in the amplified output as 20 volts peak-to-peak. Thus, the output of the transmitter will in this second case have an average amplitude of 1000 volts with an approximate sine wave amplitude modulation superimposed on it between the limits of 990 volts and 1010 volts, representing a modulation of 1%. Also, the output of the amplifier will be phase modulated 5.5°±. In order to reproduce the original signal from the SSB generator with its initial characteristics except amplified to a higher level, it is necessary to match the initial 5.5°± phase modulation with the initial 10% amplitude modulation. In order to obtain this condition, the AM component must be amplified ten times as much in the second case as it was amplified in the first case. In other words, for variable-average-amplitude signals such as voice, to have perfect cancellation of the undesired lower sideband due to PM, it is necessary that the AM component used to cancel the PM component be variably amplified.

The action of the aforesaid Kahn amplifying system with voice input can be explained in another way. In order to avoid distortion in the SSB amplifier, the output of the amplifier must have the same waveform as the input to the amplifier (that is, the output of the low-power SSB generator). Now, the amplifier input (the output of a SSB generator modulated by voice signals) has a varying average amplitude level, which is inherent in voice modulation, due to syllabic amplitude variations in speech. However, the average amplitude level of an AM transmitter (which is the type of transmitter used in the output portion of the Kahn amplifier system) cannot vary unless the modulator is capable of responding down to zero frequency or D. C. Thus, unless such type of modulator (which is quite expensive) is used, distortion will result when the Kahn SSB amplifier is used for voice input signals. In other words, since the average output level of the SSB amplifier cannot economically be varied at syllabic frequency, it is necessary to remove the syllabic frequency variations from the input to the amplifier.

To further explain the requirement for the present invention, it should be understood that in the Kahn SSB amplifier described in the foregoing application Serial No. 242,061 and in the IRE paper, the average output amplitude of the class C RF amplifiers (in the PM channel) must remain constant since no means is provided for changing this average amplitude and since, due to the limiter action in the driver circuit, the driving power remains constant; furthermore, the class C amplifiers themselves serve as limiters. The high level amplitude modulator which controls the plate voltage of the last stage of the class C amplifier can only affect the output of the transmitter at a rate on the order of 100 C. P. S. or higher, depending upon the characteristics of the audio modulating system, particularly its low frequency cut-off characteristics. Thus, even though the output of the SSB generator varies widely in average amplitude, the output of the transmitter cannot follow this variation, except at the 100 C. P. S. rate or higher. The output of the RFPA, with no input to its voice frequency (AM component) modulator, will contain all of the PM components which were initially present in the SSB generator output, and these PM components will remain at their maximum values despite variations in the level delivered by the SSB generator. The Kahn amplifying system relies upon a cancellation of the undesired sidebands in the PM spectrum by means of similar but opposite sideband components produced by the AM in the RFPA. Since the amplified PM components have an amplitude greater than that necessary to cancel the undesired AM components when the modulating signal decreases below its maximum allowable value, it is necessary that the AM components be amplified by a similarly greater amount, this condition being satisfied when the AM components are prevented from varying at a syllabic frequency rate, but instead are caused to remain at their highest permissible values.

In Fig. 6 of the aforementioned Kahn application, an "output level control," operating on the "modulated power amplifier," is used for faithful transmission of varying-average-amplitude signals (such as voice) by the SSB amplifying system described, by way of variable amplification of the AM component. Such a control, however, takes the form of a series of D. C. amplifiers which effect D. C. modulation of the modulated power amplifier output, and such a D. C. modulator is quite expensive, operating as it does on a high-level stage or stages.

An object of this invention, therefore, is to devise a novel system for effecting cancellation of the spurious sidebands at the output of a SSB amplifier of the two-channel type, for varying-average-amplitude modulating signals, such as voice.

Another object is to devise a cancellation system of the type described in the preceding paragraph, which does not require the use of a D. C. modulator.

A still further object is to provide a SSB amplifying system with improved anti-jamming characteristics.

The objects of this invention are accomplished, briefly, in the following manner: a controllable-gain amplifier is inserted between the output of a SSB generator and the input of a SSB amplifier of the two-channel, split-component type including as the output stage thereof a modulated RFPA. The gain of this first-mentioned amplifier is controlled in response to the average amplitude of the syllabic frequency modulations applied to the SSB generator, in such a way that the wave appearing at the output of the AM detector in the SSB amplifier is of constant average amplitude, regardless of the varying average amplitude of the voice frequency signals applied to the SSB generator. An idle-time circuit arrangement acts, after a certain time with no voice modulation on the circuit, to disable the modulated RFPA stage in the SSB amplifier and to connect the antenna to an intermediate low-power amplifier stage.

The objects of this invention will be better understood from the following description of an exemplification thereof, reference being had to the accompanying drawing, wherein the single figure is a combined block diagram and detailed schematic of a SSB amplifying system utilizing this invention.

Now referring to the drawing, a low-power SSB generator 1 is of more or less conventional design and is adapted to be supplied with modulating signals of varying average amplitude, such as voice signals which may be derived from a telephone circuit (see "phone input" to generator 1). Voice signals, it is desired to be pointed out, have an average amplitude which may vary at a syllabic frequency rate. According to this invention, these syllabic modulations are removed from the transmitted signal. The SSB generator 1 produces a SSB, suppressed-carrier output which depends upon the phone or voice modulating signal input thereto. In a typical embodiment of this invention, the output of generator 1 may be at a carrier frequency of 150 kc., as indicated in the drawing. The sideband frequencies may be spaced either above or below this carrier frequency, depending upon whether the upper sideband or the lower sideband is produced at the output of generator 1. It will be assumed that the generator 1 is adjusted to produce the upper sideband, and also that this generator is adjusted for 20 db suppression of the carrier. This latter statement means that the amplitude of the carrier out of generator 1 is 10% of the amplitude of the maximum allowable modulation, and the carrier power is 1% of the modulation power.

A portion of the output of generator 1 is impressed on the primary of an input transformer 26 of a gain-controlled amplifier 2. Opposite ends of the secondary of transformer 26 are connected to respective grids 27 and 28 of a dual triode vacuum tube 21, which is of a remote cut-off type suitable for controllable gain. The respective anodes of tube 21 are connected to respective opposite ends of the primary of an output transformer 29, while the midpoint of this primary winding is connected to the positive terminal of a suitable source of polarizing potential. The cathodes of the two triode structures of tube 21 are grounded, as illustrated, and thus connected to the negative terminal of the source. The potentials are such that amplifier tube 21 has a maximum gain (for the SSB signal impressed thereon from generator 1) with zero grid bias voltage, and the gain can be reduced by increasing the grid bias voltage. Bias is obtained by way of battery 22 (the positive terminal of which is grounded, as are the cathodes of tube 21) and a triode vacuum control tube 23 the cathode of which is connected to the negative terminal of battery 22 and the anode of which is connected through respective isolating resistors 5 and 6 to the respective grids 27 and 28, and also by way of a resistor 24 one end of which is grounded and the opposite end of which is connected to the anode of tube 23.

The secondary of output transformer 29 is connected to the input of a SSB amplifier 4, so it can be said that the amplifier 2 is in the connections (or signal path) between the output of SSB generator 1 and the input of amplifier 4. The SSB amplifier 4, which is illustrated partly schematically and partly by a block, is of the two-channel or split-component type described and claimed in the aforementioned Kahn application. The present invention may be related to the Kahn application by inserting the controlled amplifier 2 of this invention into the Kahn system between Kahn's SSB generator 1 and his linear RF amplifier 2 (which latter amplifier feeds the limiter 3 in his PM channel and also the AM detector 19 in his AM channel). In amplifier 4, as in the Kahn SSB amplifying system, the output of a low-power SSB generator is split into two components, one a PM component and the other an AM component; these two components are separately handled in respective PM and AM channels. In the PM channel of amplifier 4, there are limiters to remove the AM component, class C amplifiers to amplify the PM component of the SSB signal, and also, if desired, frequency dividers and heterodyning or mixing circuits to change the frequency of the PM component. The AM channel of amplifier 4 includes an AM detector to detect the amplitude modulation on the AM component of the SSB signal, an audio amplifier to amplify the audio signal, and a delay network for delaying the audio signal. Finally, in the amplifier 4, there is an amplitude modulator by means of which the detected and amplified audio signal is modulated onto the amplified and changed-frequency PM component of the SSB signal, in a modulated RFPA, the final PA stage of which, including triode vacuum tube 7, is illustrated in detail. For a more detailed disclosure of the SSB amplifier 4, reference may be had to the aforementioned Kahn application, Serial No. 242,061.

Another portion of the output of SSB generator 1 (which output, as previously stated, may be a 150 kc. SSB suppressed-carrier signal) is impressed on the primary of an input transformer 8. One end of the secondary of transformer 8 is grounded and a potentiometer 32 is connected across said secondary, the movable arm of said potentiometer being connected to the grid 9 of a triode vacuum tube 31 the cathode of which is grounded; by means of these connections, the potentiometer 32 can be used as a gain control, to adjust the amplitude of the 150 kc. SSB signal impressed on grid 9. Tube 31 amplifies the 150 kc. signal and applies the amplified signal to an output transformer 10 one end of the primary of which is connected to anode 11 of tube 31 and the other end of which is connected to the positive terminal of an anode potential source.

The secondary of transformer 10 impresses the output of amplifier 31 on a full-wave rectifier circuit including two diodes 33 and 34. This rectifier circuit is connected in a conventional manner and serves to rectify the amplified 150 kc. energy and to impress the rectified voltage on a load resistor 35 which is shunted by a capacitor 12. By the action of the rectifier circuit described, all of the modulation component frequencies, both syllabic frequencies and voice frequencies, appear across resistor 35 and capacitor 12 and the amplitude of each modulation component at resistor 35 is proportional to the average amplitude of the same modulation frequency applied by means of the "phone input" lines to generator 1. Thus, since tube 31 amplifies and since the rectifier-detector circuit 33, 34 etc. performs an averaging function, the unit 3 may be termed an "average amplifier detector."

The rectified voltage is impressed on the input of a low-pass filter 36 which is connected across resistor 35 and capacitor 12. The cutoff frequency (e. g., on the order of 100 C. P. S.) of filter 36 is such that it suppresses the voice frequency components but passes the syllabic frequency components which appear across resistor 35 and capacitor 12, and impresses the latter on terminating resistor 37 at the output of filter 36. The polarity of the voltage resulting from the rectified syllabic frequencies is as indicated, the upper end of resistor 37 being negative and the lower end thereof being positive.

The voltage across resistor 37 is impressed on the grid 13 of tube 23 in series opposition to the voltage provided by a bias battery 25, by means of a pair of leads 14 and 15. Lead 14 is connected to the upper end of resistor 37 and to the cathode of tube 23, while lead 15 is connected to the lower end of resistor 37 and to the positive terminal of battery 25; to complete the biasing circuit for tube 23, the negative terminal of battery 25 is connected to grid 13. Thus, the voltage on grid 13 of tube 23 with respect to its cathode is derived in part from average amplifier-detector 3.

When the net voltage on grid 13 is maximum negative (that is, when no rectified syllabic frequency components appear at the output of filter 36, the voltage across resistor 37 then being zero and the voltage on grid 13 being determined by battery 25), the anode current of tube 23 is cut off and no voltage drop then appears across resistor 24. This results in zero bias on the grids of tube 21 (grids 27 and 28 then being at ground potential), a maximum gain in amplifier 2 and a maximum voltage impressed on the SSB amplifier circuits in amplifier 4. In this connection, it will be recalled that tube 21 has a maximum gain for zero bias voltage.

When the net voltage on grid 13 decreases from its maximum negative value (in response to rectified syllabic frequency components appearing across resistor 37 and developing a voltage in opposition to that of battery 25), the anode circuit of tube 23 begins to carry current, which flows through resistor 24 (which is in series in the anode circuit of tube 23) and develops an IR drop thereacross having the polarity indicated. This causes a certain negative bias voltage to be impressed on the grids of tube 21 (since resistor 24 is in the grid-cathode circuits of this tube), thus reducing its gain. It will be recalled that the gain of tube 21 is reduced when its bias voltage is increased. Under these conditions, then, a reduced voltage will be impressed on the SSB circuits in amplifier 4. When the net voltage on grid 13 decreases to zero with respect to the cathode of tube 23, the IR drop across resistor 24 will be sufficient to reduce the gain of tube 21 to a very low value, or even to a zero value if required.

As previously explained, the rectified syllabic modulation across resistor 37 is impressed on grid 13 of tube 23 in controlled amplifier 2, changing the gain of tube 21 (in amplifier 2) in accordance with the average amplitude of the syllabic modulation components impressed on generator 1. The averaging is carried out by the full-wave rectifier in "average amplifier-detector" 3, as described above. Gain control 32 and the voltage of bias battery 25 are so adjusted that the gain of amplifier 2 (tube 21) is decreased as the average amplitude of the syllabic modulation increases. Thus, the syllabic modulation is removed from the SSB generator output by the action of amplifier 2, so that the AM components of the SSB generator output, as applied to amplifier 4, no longer vary with the average amplitude of the modulating signal (voice), but are prevented from varying and caused to remain at their highest permissible value. Then, the average amplitude level of the carrier and sidebands going into the AM detector in amplifier 4 is constant and the undesired sidebands are cancelled or balanced out at the output of the RFPA in amplifier 4, even though modulating signals which are not of constant average amplitude (e. g., voice) are used on generator 1. At the same time, the controlled amplifier 2 and the average amplifier-detector 3 are much simpler in design, and substantially less expensive, than a D. C. modulator, which would otherwise be necessary to cause the average amplitude level of the AM component of the SSB wave, coming out of the modulated RFPA of amplifier 4, to vary as the amplitude modulation level on the SSB generator output varies.

It is desired to be made clear, at this point, that the carrier power output of amplifier 4 varies when the modulation input level to generator 1 varies over a certain range, and specifically, that the carrier power output of amplifier 4 varies in an inverse direction to the modulating power, down to the point where the modulation component at the input to generator 1 decreases to a lower level than the carrier component at the output of generator 1. This scheme of causing the carrier output to vary may be termed "floating carrier" operation. This feature of the invention will now be explained. We will assume, as previously stated, that the generator 1 is adjusted for 20 db suppression of the carrier. If with 100% modulating signal level (AF) input the carrier is 20 db down, the amplitude of the carrier is 10% of the maximum allowable modulation and its power is 1%. It will also be assumed that the modulation input signal is 1000 C. P. S., that this signal varies from 100% of the maximum allowable level down to zero, and that the SSB generator 1 produces the upper sideband. Condition "*a*" is 100% modulation signal level, condition "*b*" is 10% modulation signal level, while condition "*c*" is zero modulation signal level.

In the initial adjustment of the transmitter for condition "*a*" it is assumed that the 100% modulation is impressed on the SSB generator 1 and that the gain of the audio amplifier in box 4 is adjusted until the upper sideband appears in the output of amplifier 4 and components which might have formed the lower sideband are balanced out. No further adjustments are made.

Condition "*a*" may be represented by a vector diagram with two vectors, one representing the modulation component (100%) out of the SSB generator and the other representing the carrier (10%). This modulation gives a resultant RF component at the output of generator 1 which is at a frequency 1000 C. P. S. above the carrier frequency, which component is modulated to a maximum deviation of 5.5°, more or less, in both the plus and minus directions.

As previously described, the output of a limiter is used to drive the class C amplifiers in unit 4. This limiter output is of a constant amplitude but its phase is varying with the modulation, as must be the case for the PM component of a SSB signal. This PM results in the production of sidebands both above and below the frequency of the predominant component, which may be the carrier component or the modulation component. The AM effected by the amplitude modulator also produces sidebands both above and below the frequency of the predominant component, which as before may be the carrier component or the modulation component. When the adjustment is properly made as previously described, the lower sideband components due to PM are balanced out by the lower sideband components due to AM, leaving only the suppressed carrier and the upper sideband, as desired.

Now, reference will be made to condition "*b*," wherein the modulation input signal is reduced to a 10% level. The "equivalent carrier" (meaning the "carrier" for the amplitude modulator in unit 4, which "carrier" is actually the PM component of the input SSB signal) at the output of unit 4 would, if controlled amplifier 2 were bypassed or made of fixed gain, still have an amplitude of 100%, instead of the approximately 10% required to duplicate the SSB wave produced at the output of generator 1. The audio frequency modulation wave going into the amplitude modulator in unit 4 would, if controlled amplifier 2 were bypassed or made of fixed gain, have an average level of about 10%. This amount of modulation voltage would modulate the "equivalent carrier" by about 10%. The sidebands thus generated from this amplitude modulation (in unit 4) are much lower in amplitude than those generated by the PM (i. e., in the PM spectrum of generator 1), since under condition "*b*" the resultant RF component at the output of generator 1, which is at a frequency 1000 C. P. S. above the carrier frequency, is modulated to a maximum deviation of 90° in both the plus and minus directions. Therefore, in the absence of this invention or in the absence of any change in the level of the SSB signal going into unit 4, the conditions for suppressing the lower sideband in amplifying system 4 are not met.

In order to meet these latter conditions, the AM applied to the amplitude modulator in unit 4 has to be increased to provide a modulation of the "equivalent carrier" of about 79%. This increase of the AM is provided by the present invention (including gain-controlled amplifier 2, the gain of which is controlled in the manner previously described) which, by increasing the gain of the signal passing through amplifier 2 in response to a decrease in the amplitude of the modulation signal going into generator 1, in effect increases the gain of the audio amplifier in unit 4 by the proper amount to amplitude modulate the RF in unit 4, in an optimum manner.

It may now be seen that when the present invention is applied the carrier power output of unit 4 does not remain constant. For condition "*a*" (with 100% audio frequency input to generator 1) the carrier is 20 db down. This means its amplitude is 10% of that of the maximum allowable modulation and its power is 1%. For condition "*b*" the carrier vector is equal in length to the modulation vector, since then they are both 10%. Thus, half of the total power is in the carrier. However, for condition "*b*" (due to the action of amplifier 2) an analysis will show that the average power at the output of unit 4 has been increased from 101% to 123%. Half of this latter figure is 61.5% and this is the power in the carrier for condition "*b*." Thus, when we change from condition "*a*" to condition "*b*" the carrier power increases from 1% to 61.5%.

For condition "*c*" (zero modulation signal level) all of the power is in the carrier, so the carrier power output has for this condition increased further, to a value of 100%.

As described, the carrier power output of unit 4 increases or goes up when the modulating power decreases. In fact, when no one is speaking on the circuit (i. e., when the voice modulation drops to zero) the carrier power increases to 100%. This provides an anti-jamming effect at the receiver. The carrier is very strong when nobody is speaking and this strong carrier protects the receiver by strongly retaining control of the automatic frequency control circuits at the receiver, thus preventing any unauthorized or jamming signal from "grabbing hold of" the receiver by means of its automatic frequency control circuits.

It may be seen that the output of the amplifier 4 (that is, the output of the transmitter of this invention) does not represent a faithful reproduction of the output from SSB generator 1, since the syllabic modulation has been removed therefrom by the action of amplifier 2. As previously described herein, however, when the output of the unit 4 is higher than the receiver input that is normally required (i. e., the input to the receiver that would be required if the syllabic modulation had not been removed from the transmitted wave, at the transmitter), the carrier frequency component is also higher, in equal proportion. This action has been explained above, in connection with so-called "floating carrier" operation. Thus, the carrier frequency component gives the receiving equipment at the other end of the radio circuit a clue as to how to readjust the signal level to correspond to the original amplitude. For example, when the receiver receives an increase in the carrier component it knows that it must reduce its own gain in inverse proportion, in order to replace the syllabic modulation. The automatic gain control in many receivers is already set up to do just this. The carrier frequency is filtered out from the other components and used to control the automatic gain devices such that the carrier in the receiver output remains at a substantially constant level. The automatic gain devices at the receiver then operate to remodulate the sideband frequencies at syllabic rate, to reproduce the syllabic values in the original voice wave impressed on the SSB generator.

For example, assume that, at the transmitter, amplifier 2 is so controlled that in order to obtain cancellation of the undesired sidebands in unit 4 the AM component of the SSB signal is amplified ten times as much in a second case as it was in a first case. Then, the carrier level at the transmitter output would be, say, 100 volts in the first case and 1000 volts in the second case. At the receiver, in the second case the gain would automatically be adjusted (by means of the carrier-responsive automatic gain control) to $\frac{1}{10}$ its value in the first case. This compensates for the extra gain of 10:1 in the transmitter, so that the original relative levels of carrier and side frequencies will be restored.

Since the gain in the transmitter is expanded and that in the receiver is compressed, or (if the modulation level begins with an intermediate value and goes up) the transmitter gain is compressed and the receiver gain is expanded, the transmit-receive system herein disclosed is very analogous to a so-called "compandor" system, which provides an improvement in the signal-to-noise ratio at the receiver.

The output of the full-wave rectifier (including diodes 33 and 34) across resistor 35 and capacitor 12 includes voice frequency components derived from the SSB generator output wave. These components are applied through capacitors 38 and 39 to the primary of the input transformer 16 of a keying circuit 17. A full-wave rectifier circuit including two diodes 30 and 40 is coupled to the secondary of transformer 16. This rectifier circuit produces across its load resistor 18 a voltage corresponding to the average amplitude level of the voice frequency components in the SSB generator output, this voltage having the polarity indicated at the ends of resistor 18. A fast-charge, slow-discharge condenser circuit is connected across resistor 18, this circuit consisting of a diode 20 and a capacitor 19 in series. The voltage across resistor 18 is used to charge capacitor 19 through diode 20.

The voltage across capacitor 19 is impressed between the grid 41 and the cathode 42 of a triode vacuum tube 43, in series with a bias battery 44. The positive terminal of battery 44 is grounded, as is cathode 42, the lower plate of capacitor 19 is connected to the negative terminal of battery 44, and the upper plate of capacitor 19 is connected to grid 41. The winding of a relay 45 is connected in series in the anode circuit of tube 43, between the tube anode and the positive terminal of a source of unidirectional potential. The flow of sufficient anode current in tube 43 causes relay 45 to be energized or closed. It is illustrated in its open position in the drawing. Relay 45 carries a pair of normally-open contacts 46 which when closed supply modulated unidirectional anode potential to the modulated RFPA tube 7 of unit 4 and which when open remove potential from this tube, thereby to disable this tube as far as any amplification is concerned. The anode potential supplied by way of contacts 46 to the anode of tube 7 is derived from a modulator in turn excited by the AM component of the SSB signal, so that this anode potential is modulated by such AM component. The tube 7, which is supplied with modulated anode potential, is an anode modulated stage, in which (as is well known to those skilled in the modulation art) AM takes place. In stage 7, therefore, AM of the PM component, with the amplitude modulations on the AM component of the SSB signal, takes place. Relay 45 carries also a pair of normally-open contacts 47 which when closed couple the output of the modulated PA tube stage 7 to a suitable transmitting antenna 49, and also carries a pair of normally-closed contacts 48 which normally couple the output of an intermediate low-power stage in amplifier 4 to the antenna 49.

The mode of operation of the "idle time" keying circuit 17 will now be explained. When the 150-kc. carrier supplied to the SSB generator 1 begins to be modulated with voice frequency modulation components, a rectified voltage appears across resistor 18 of the keying circuit. This voltage has a polarity such that it rapidly charges capacitor 19 through diode 20, the polarity of the charge on this capacitor being such as to overcome the negative potential of bias battery 44, thus allowing anode current to flow in tube 43 and energizing relay 45 to close its contacts 46, to close its contacts 47 and to open its contacts 48. When relay 45 is open or unenergized there is only a low-power output from the transmitter, due to the removal of anode potential from PA tube 7 and to the opening of the signal circuit between this tube and the antenna 49 and to the closing of the signal circuit between a low-power amplifier stage and said antenna. However, when relay 45 is energized in the manner above described, the transmitter output immediately goes to its full value, due to the application of anode potential to tube 7 (via relay contacts 46) and to the closing of the signal circuit between this tube and antenna 49 (via relay contacts 47) and to the opening of the signal circuit between the low-power amplifier stage and the antenna (by opening of relay contacts 48).

Should the voice frequency modulation disappear from the 150-kc. SSB output of generator 1, as would be the case if the SSB equipment disclosed were used for voice transmission and the voice modulation ceased, the charging voltage across resistor 18 would disappear. Capacitor 19 then discharges slowly through diode 20 (in the reverse direction) and resistor 18 and, after a number of seconds (e. g., 10 seconds) determined by the constants of elements 18, 19 and 20, the negative bias on grid 41 of tube 43 is restored, causing the anode current in tube 43 to decrease, thus de-energizing relay 45. This opens contacts 46 and 47 and closes contacts 48, dropping the power from the transmitter to a very low value by de-energizing PA stage 7 and by connecting the antenna to a low-power stage in the amplifier 4. Thus, when relay 45 is open or de-energized, a low-power carrier signal is supplied to the antena 49, for use in automatic frequency control at the receiver.

It may be seen that the keying circuit 17 provides means for saving power, and for increasing tube life, in a class of service wherein the modulation is on for only a portion of the total time, and wherein there is thus appreciable "idle time."

An additional device (not shown) would be desirable, in order to eliminate the distortion which might be caused when the amplifier including tube stage 7 is reactivated after an idle period (i. e., after a period during which the keying circuit 17 has acted to de-energize relay 45). This device takes the form of a delay circuit inserted in the signal channel at any point in amplifier 2 or at any point subsequent to that at which a portion of the signal is taken off for use in average amplifier detector 3 and in keying circuit 17. This delay circuit might be, for example, an RF (150 kc.) delay line which operates to delay the signal applied to tube 7 but does not delay nor have any effect on that portion of the signal used to energize the relay 45 of keying circuit 17. Thus, this additional device, by delaying the signal but not the energization of the keying circuit relay, makes certain that the reactivation of the transmitter, after an idle period, is effected before it is called upon to amplify any signals. In this way, any distortion which might otherwise be caused, is eliminated.

What is claimed is:

1. In a single sideband transmitter, a single sideband generator producing a single sideband output wave, means coupled to the output of said generator for separating said wave into its phase modulation and amplitude modulation components, means for supplying to said generator a modulating signal of varying average amplitude, thereby producing an amplitude modulation component of varying average amplitude in said output wave from said generator, means for modulating the amplitude modulations on said amplitude modulation component onto said phase modulation component, and means in the coupling between said generator and said separating means for maintaining said amplitude modulation component at an amplitude level such as to cancel, in the last-named modulating means, the undesired sideband frequencies in the phase modulation component.

2. In a single sideband transmitter, a single sideband generator producing a single sideband output wave, means coupled to the output of said generator for separating said wave into its phase modulation and amplitude modulation components, means for supplying to said generator a modulating signal of varying average amplitude, thereby producing a modulation component of varying average amplitude in said output wave from said generator, means for modulating the amplitude modulations on said amplitude modulation component onto said phase modulation component, and variable-gain means in the coupling between said generator and said separating means, said last-mentioned means acting to change the amplitude level of said output wave at said separating means in response to a change in the average amplitude of said modulating signal.

3. In a single sideband transmitter, a single sideband generator producing a single sideband output wave, means coupled to the output of said generator for separating said wave into its phase modulation and amplitude modulation components, means for supplying to said generator a modulating signal of varying average amplitude, thereby producing an amplitude modulation component of varying average amplitude in said output wave from said generator, means for modulating the amplitude modulations on said amplitude modulation component onto said phase modulation component, and variable-gain means in the coupling between said generator and said separating means, said last-mentioned means acting to decrease the amplitude level of said output wave at said separating means in response to an increase in the average amplitude of said modulating signal.

4. In a single sideband transmitter, a single sideband generator to which a band of modulation frequencies is supplied, a single sideband amplifier, a coupling between the input of said amplifier and the output of said generator, a controllable-gain amplifier in said coupling, and means responsive to modulation frequencies of a predetermined range on the single sideband output of said generator for controlling the gain of said controllable-gain amplifier.

5. A single sideband transmitter as defined in claim 4, wherein the modulation frequencies supplied to the generator are voice frequencies, and wherein said predetermined range of modulation frequencies includes syllabic frequencies.

6. A single sideband transmitter as defined in claim 4, wherein the gain of said controllable-gain amplifier is decreased as the amplitude of the modulation frequencies of said predetermined range increases.

7. A single sideband transmitter as defined in claim 4, wherein the modulation frequencies supplied to the generator are voice frequencies, wherein said predetermined range of modulation frequencies includes syllabic frequencies, and wherein the gain of said controllable-gain amplifier is decreased as the amplitude of the syllabic frequencies increases.

8. In a single sideband transmitter, a single sideband generator producing a single sideband output wave, means coupled to the output of said generator for separating said wave into its phase modulation and amplitude modulation components, means for supplying to said generator a modulating signal of varying average amplitude, thereby producing an amplitude modulation component of varying average amplitude in said output wave from said generator, means for modulating the amplitude modulations on said amplitude modulation component onto said phase modulation component, a controllable-gain amplifier in the coupling between said generator and said separating means, and means responsive to modulation frequencies of a predetermined range on said single sideband output wave for controlling the gain of said amplifier.

9. A single sideband transmitter as defined in claim 8, wherein said predetermined range of modulation frequencies includes syllabic frequencies.

10. A single sideband transmitter as defined in claim 8, wherein the gain of said amplifier is decreased as the amplitude of the modulation frequencies of said predetermined range increases.

11. A single sideband transmitter as defined in claim 8, wherein said predetermined range of modulation frequencies includes syllabic frequencies, and wherein the gain of said amplifier is decreased as the amplitude of the syllabic frequencies increases.

12. In a single sideband transmitter, a single sideband generator to which a band of modulation frequencies is supplied, a single sideband amplifier, a coupling between the input of said amplifier and the output of said generator, a controllable-gain amplifier in said coupling, means responsive to modulation frequencies of a predetermined range on the single sideband output of said generator for controlling the gain of said controllable-gain amplifier, and means, including in part said last-mentioned means, responsive to the absence of modulation frequencies on said generator for reducing the output power of said first-named amplifier.

13. A single sideband transmitter as defined in claim 12, wherein the modulation frequencies supplied to the generator are voice frequencies, and wherein said predetermined range of modulation frequencies includes syllabic frequencies.

14. A single sideband transmitter as defined in claim 12, wherein the gain of said controllable-gain amplifier is decreased as the amplitude of the modulation frequencies of said predetermined range increases.

15. A single sideband transmitter as defined in claim 12, wherein the modulation frequencies supplied to the generator are voice frequencies, wherein said predetermined range of modulation frequencies includes syllabic frequencies, and wherein the gain of said controllable-gain amplifier is decreased as the amplitude of the syllabic frequencies increases.

16. In a single sideband transmitter, a single sideband generator to which a band of modulation frequencies is supplied, a single sideband amplifier, a coupling between the input of said amplifier and the output of said generator, a controllable-gain amplifier in said coupling, means responsive to modulation frequencies of a predetermined range on the single sideband output of said generator for controlling the gain of said controllable-gain amplifier, and means, including in part said last-mentioned means, responsive to the presence of modulation frequencies on said generator for increasing the output power of said first-named amplifier.

17. In a single sideband transmitter system, means for producing a single sideband signal in the form of a complex wave from a source of intelligence of varying average amplitude, said single sideband wave having amplitude modulation of varying average amplitude and phase modulation components, means for amplifying substantially only said phase modulation component, means for amplifying only the amplitude modulation envelope of said single sideband complex wave, means for combining the amplified modulation envelope with the amplified phase modulation component to provide a resultant amplitude modulated and phase modulated wave representative of said single sideband complex wave, and means responsive to variations in the average amplitude of the output wave from said first-named means for maintaining substantially constant the average amplitude of the amplitude modualtion component operated on by said second-mentioned amplifying means, said last-named means being coupled between said first-named means and said amplifying means.

References Cited in the file of this patent

UNITED STATES PATENTS

| | | |
|---|---|---|
| 2,020,327 | Purington | Nov. 12, 1935 |
| 2,155,506 | Reinartz | Apr. 25, 1939 |
| 2,606,971 | Scott | Aug. 12, 1952 |
| 2,666,133 | Kahn | Jan. 12, 1954 |